United States Patent [19]

Swadner et al.

[11] Patent Number: 5,163,302
[45] Date of Patent: Nov. 17, 1992

[54] AIR CONDITIONING SYSTEM WITH PRECOOLER

[75] Inventors: Robert L. Swadner, East Amherst; Nikolaos A. Adonakis, Grand Island, both of N.Y.

[73] Assignee: General Motors Corporation, Detroit, Mich.

[21] Appl. No.: 779,761

[22] Filed: Oct. 21, 1991

[51] Int. Cl.⁵ ............................................... B60H 1/32
[52] U.S. Cl. ..................................... 62/244; 62/323.2; 62/332
[58] Field of Search ...................... 62/244, 323.2, 332

[56] References Cited

U.S. PATENT DOCUMENTS

| | | | |
|---|---|---|---|
| 1,985,636 | 12/1934 | Foss | 62/323.2 X |
| 2,548,508 | 4/1951 | Wolfner | 62/332 X |
| 2,990,694 | 7/1961 | Kummerlowe et al. | 62/141 |
| 3,947,230 | 3/1976 | Zetterstrom et al. | 431/168 |
| 3,953,983 | 5/1976 | Sander | 62/79 |
| 4,307,575 | 12/1981 | Popinski | 62/244 X |
| 4,374,468 | 2/1983 | Takeshita et al. | 62/233 |
| 4,471,630 | 9/1984 | Sugimoto et al. | 62/175 |
| 4,548,048 | 10/1985 | Reimann et al. | 62/238.3 |
| 4,745,768 | 5/1988 | Schorr et al. | 62/332 X |
| 4,819,445 | 4/1989 | Scherer | 62/238.3 |
| 4,890,463 | 1/1990 | Cantoni | 62/283.3 |

Primary Examiner—William E. Tapolcai
Attorney, Agent, or Firm—Patrick M. Griffin

[57] ABSTRACT

A primary air conditioning system for a vehicle has an engine driven compressor which supplies refrigerant to a cooling subsystem comprising a condenser, and expansion valve, and an evaporator. A precooling system has an absorption type system which supplies refrigerant to the cooling subsystem which it shares with the primary system. A combustion unit fueled by the vehicle fuel supplies heat to the generator of the precooling system. The precooling system is used to at least partially cool the vehicle interior before it is occupied, and the primary system is used when the engine is running.

5 Claims, 2 Drawing Sheets

AIR CONDITIONING SYSTEM WITH PRECOOLER

FIELD OF THE INVENTION

This invention relates to automotive air conditioning and particularly to a system capable of cooling the vehicle prior to starting the engine.

BACKGROUND OF THE INVENTION

The two principal forms of refrigeration systems are the compressor type which is driven by a motor and the absorption type which is energized by a heat source. Automotive air conditioners typically are of the compressor type wherein the compressor is driven by the engine to compress a refrigerant vapor which is then circulated through a condenser to remove heat from the vapor and change it to liquid state, an expansion valve to reduce the pressure on the refrigerant and an evaporator which permits the return of the refrigerant to vapor state and removes heat from the surrounding air. This type of air conditioner is efficient in operation and has been highly satisfactory for automotive use whenever the engine is running.

A shortcoming of the conventional automotive air conditioners is that before the engine is started and the system is turned on the vehicle often is hot, so that the occupants must bear the discomfort until the air conditioner gradually reduces the air temperature to a comfortable level.

It is proposed then to provide a cooling system which could be operated without running the engine and thus could be started in advance of entering the vehicle to precool the vehicle. While it may be suggested to drive the compressor from the vehicle battery, the air conditioner load would soon deplete the battery reserve. It is possible to use an absorption type refrigeration system instead of or in addition to the compressor type. However, compared to the compression type, the absorption systems are relatively inefficient and are limited in their application. If an absorption type alone were used for vehicle cooling it would not have sufficient capacity to adequately cool the vehicle. If separate absorption and compressor types were used, the cost, weight and space requirements of both systems would be unacceptable.

SUMMARY OF THE INVENTION

It is therefore an object of the invention to provide a hybrid system for precooling and normal air conditioning having the advantages of both compressor and absorption types of refrigeration cycles without the burden of two separate systems.

The invention is carried out in an automotive vehicle having an engine, by an engine driven air conditioning system and a precooler system comprising: a cooling subsystem comprising a condenser, an expansion valve, and an evaporator; a primary air conditioning system having a compressor for supplying refrigerant to the cooling subsystem, a precooler system having an absorber, a generator, a heat exchanger, and a pump for supplying refrigerant to the cooling subsystem; and valve means for alternatively coupling the cooling subsystem to the primary system and the precooler system, whereby either system is effective to cool the vehicle.

BRIEF DESCRIPTION OF THE DRAWINGS

The above and other advantages of the invention will become more apparent from the following description taken in conjunction with the accompanying drawings wherein like reference refer to like parts and wherein.

DESCRIPTION OF THE INVENTION

Figure 1:
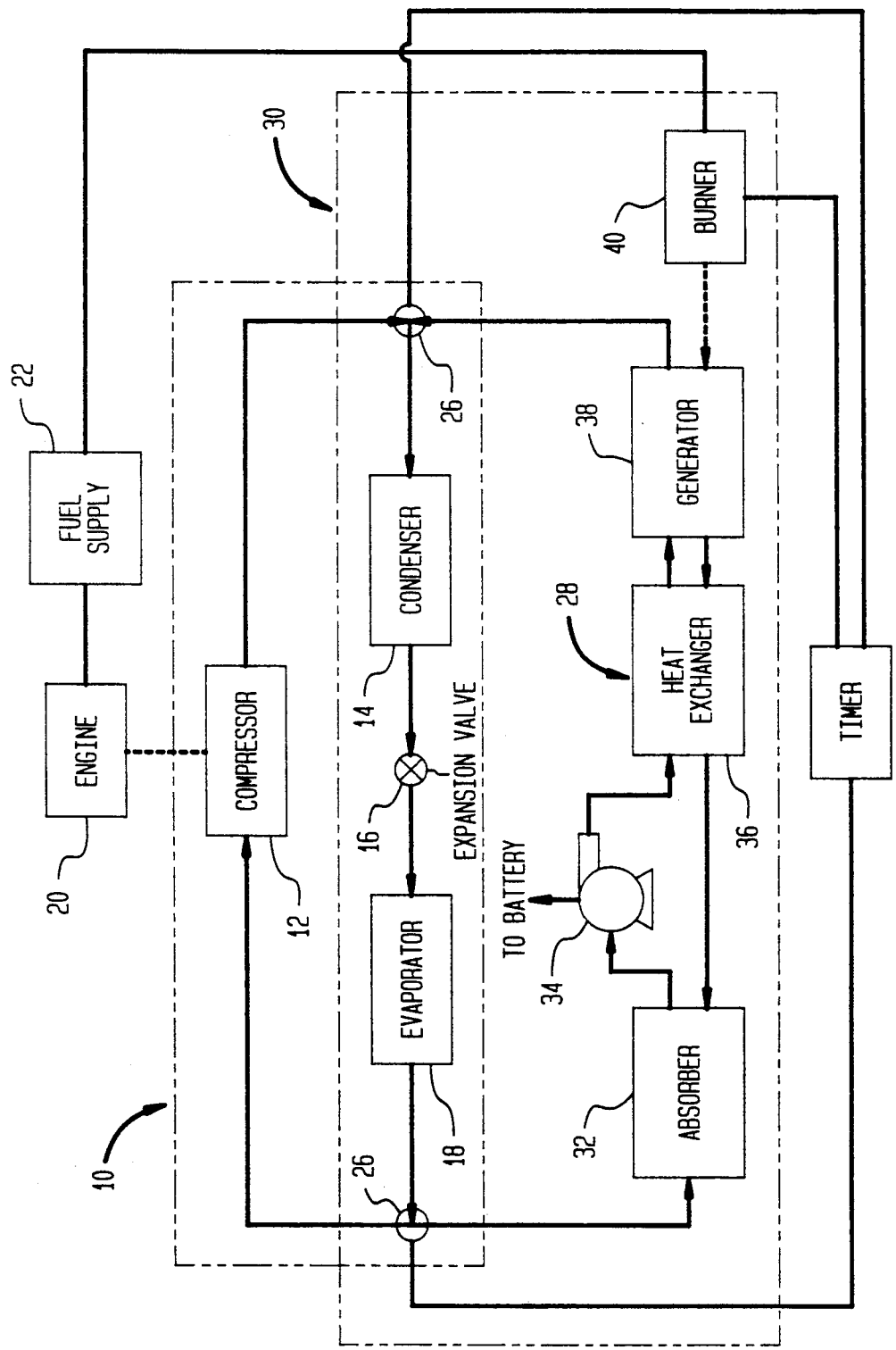
FIG. 1 is a schematic diagram of a hybrid air conditioning system according to the invention for primary cooling and for precooling.

Referring to FIG. 1, a basic automotive air conditioning system 10 has a compressor 12, a condenser 14, an expansion valve 16 and an evaporator 18 serially connected. The compressor 12 is driven by the vehicle engine 20 which is provided with fuel from a fuel supply 22. The compressor 12, when operating, receives low pressure refrigerant from the evaporator 18 and compresses the vapor. The compressed vapor is fed to the condenser 14 which is a heat exchanger for cooling the vapor and condensing it to liquid state. The liquid refrigerant is passed through the expansion valve to lower the pressure, and then into the evaporator 18 which is another heat exchanger where the refrigerant returns to vapor state and cools the surrounding air. Here, the combination of the condenser 14, the expansion valve 16, and the evaporator 18 is called the cooling subsystem 24. The ends of the cooling subsystem are joined to three-way valves 26 which selectively couple the cooling subsystem to the compressor 12 or to an absorption subsystem 28 for precooling operation.

A precooling air conditioning system 30 comprises, in addition to the cooling subsystem 24 which it shares with the primary air conditioning 10, an absorption subsystem 28 which includes an absorber 32, a pump 34 driven from the vehicle battery (not shown) a heat exchanger 36, a generator 38, and a heater 40 for the generator. The heater is any heat source such as a burner fueled by the fuel supply 22 for the engine. An absorbent liquid circulates through the absorption subsystem to carry the refrigerant vapor from the absorber to the generator. A cool absorbent in the absorber 32 dissolves the low pressure refrigerant vapor from the evaporator and thus achieves a high concentration of refrigerant. The pump 34 increases the pressure of the high concentration solution and passes it through the heat exchanger 36 to the generator 38. In the heat exchanger the high concentration solution flowing to the generator is heated by the return flow of low concentration solution from the generator. In the generator 30, which serves as a still, more heat is added to the absorbent solution by the burner 40 to raise the temperature sufficiently to boil off the refrigerant but not the absorbent. The resulting refrigerant vapor, which is now at a high pressure, flows through the cooling subsystem to cool the air surrounding the evaporator.

The working fluids in the system must have mutual affinity and solubility, chemical stability, and correct pressure-temperature relations, latent heats, specific volumes, freezing points, and corrosion and safety properties. One viable system is ammonia refrigerant and water absorbent. Alternatively, water may be the refrigerant and lithium bromide the absorbent.

Figure 2:
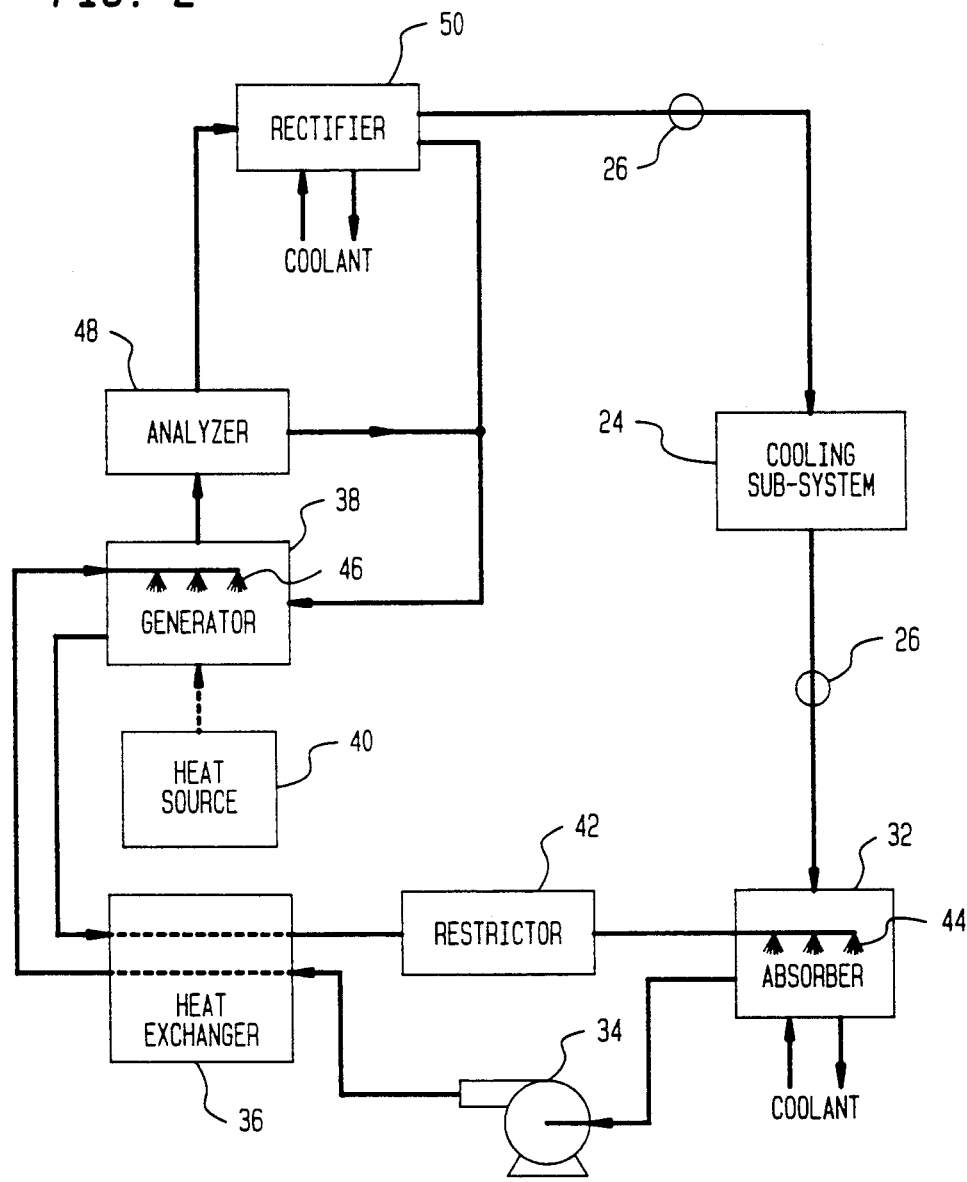
FIG. 2 is a further schematic diagram of the absorption portion of the system of FIG. 1.

The absorption system is shown in more detail and with some additional elements in FIG. 2. A restrictor 42 in the return line between the heat exchanger 36 and the absorber 32 maintains the pressure differential imposed by the pump 34. The absorber contains spray nozzles 44 for mixing the absorbing fluid with the refrigerant. The absorption process is exothermic and thus a coolant is provided for heat rejection. The generator 38 also uses spray nozzles 46 to assist in the removal of the refrigerant fraction from the high concentration solution. The low concentration solution flows back through the heat exchanger 36 and restrictor 42 to the absorber 44. In case the refrigerant vapor carries droplets of absorbent as it leaves the generator, an analyzer 48 consisting of a series of baffle plates is used to separate the droplets which are returned to the generator. Finally, after the analyzer removes the droplets, a rectifier 50 is provided to remove the absorbent vapor which may accompany the refrigerant vapor. The analyzer 48 is a heat exchanger which reduces the vapor temperature enough for the absorbent to condense but not enough for the refrigerant to condense. The condensed absorbent flow back to the generator.

Figure 3:
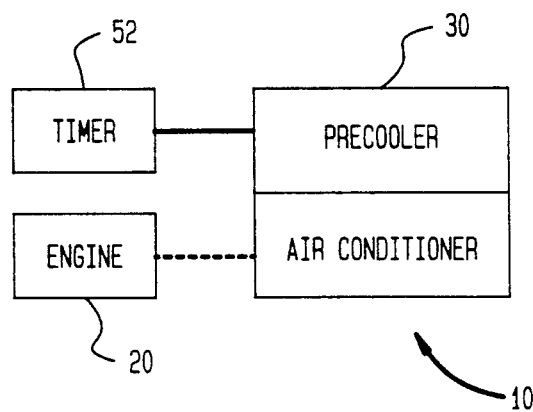
FIG. 3 is a block diagram of a timer controlled system for precooling, according to the invention.

Since the precooler 30 operates independently of the engine it can run before the engine is turned on to cool the vehicle interior so that it is comfortable for the occupants to enter. As shown in FIG. 3, a timer 52 may be set to turn on the precooler at a desired time prior to expected vehicle use. Depending on the weather, the timer would be set perhaps 15 or 30 minutes prior to use. The valves 26 which are preferably electrically operated solenoid valves are activated by the timer to connect the absorption subsystem to the cooling subsystem and to ignited the burner. Then the precooler 30 will run until the engine 20 is started and the primary air conditioner 10 is turned on. The precooler may not be adequate to reduce the vehicle interior temperature to the preferred level but will reduce it to a level which is temporarily acceptable for comfort and also greatly reduces the initial load on the compressor so that the primary system can rapidly attain the desired temperature.

Thus it will be seen that by sharing a major portion of the cooling system two types of air conditioning systems can be used alternatively to gain the advantage of both systems without the expense and space requirement of two wholly separate systems.

The embodiments of the invention in which an exclusive property or privilege is claimed are defined as follows:

1. In an automotive vehicle having an engine, an engine driven air conditioning system and a precooler system comprising:
    a cooling subsystem comprising a condenser, an expansion valve, and an evaporator;
    a primary air conditioning system having a compressor for supplying refrigerant to the cooling subsystem;
    a precooler system having an absorber, a generator, a heat exchanger, and a pump for supplying refrigerant to the cooling subsystem; and
    valve means for alternatively coupling the cooling subsystem to either the primary system or the precooler system, whereby either system is effective to cool the vehicle.

2. The invention as defined in claim 1 including means for heating the generator comprising a combustion unit fueled by vehicle fuel.

3. An air conditioning system for a vehicle comprising:
    a cooling subsystem comprising a condenser, an expansion valve, and an evaporator;
    means in series with the cooling subsystem for supplying a refrigerant under pressure to the condenser and receiving low pressure vapor from the evaporator;
    the means for supplying a refrigerant comprising alternatively a compressor and an absorption subsystem; and
    valve means for selectively coupling either the compressor or the absorption subsystem to the cooling subsystem; whereby the system can effect vehicle cooling with or without compressor operation.

4. The invention as defined in claim 3 wherein the absorption subsystem includes an absorber, a generator, a heat exchanger, a pump, and means for heating the generator.

5. The invention as defined in claim 4 wherein the vehicle has an engine supplied by a fuel system, and the air conditioning system further includes:
    means for energizing the compressor by coupling the compressor to the engine for operation thereby; and
    means for energizing the generator comprising a burner supplied by the fuel system.

* * * * *